United States Patent [19]

Baturka

[11] 4,040,764
[45] Aug. 9, 1977

[54] TOOL HOLDER

[75] Inventor: Walter Baturka, Frankenmuth, Mich.

[73] Assignee: Houdaille Industries, Inc., Buffalo, N.Y.

[21] Appl. No.: 683,666

[22] Filed: May 6, 1976

[51] Int. Cl.[2] .............................................. B23B 51/06
[52] U.S. Cl. ........................................ 408/59; 279/20; 408/226
[58] Field of Search ................. 408/59, 226, 238, 239, 408/239 A; 279/83, 1 A, 1 B, 1 S, 75, 20

[56] References Cited

U.S. PATENT DOCUMENTS

| 35,618 | 6/1862 | Mix | 279/83 |
| 1,845,123 | 2/1932 | Buhr | 279/83 X |
| 3,202,433 | 8/1965 | Davis | 408/238 X |
| 3,667,768 | 6/1972 | Stokey | 279/83 |

Primary Examiner—Othell M. Simpson
Assistant Examiner—Z. R. Bilinsky
Attorney, Agent, or Firm—Hill, Gross, Simpson, Van Santen, Steadman, Chiara & Simpson

[57] ABSTRACT

A tool holder includes a shank adapted at one end to hold a tool and to be clamped in a machine tool at its other end. The shank has a portion that provides accurate radial location, and also has means which are adjustable in order to provide accurate axial location. Such axially adjustable locating means include an elongated ramp accompanied by means defining a flat surface encircled by a lock ring which can engage the adjacent end surface of a portion of the machine tool which holds the tool holder. Any force tending to push the tool holder further into the machine tool is resisted by the inability of the lock ring to move up to a higher portion of the ramp. Preferably, there are a plurality of aligned ramps.

8 Claims, 3 Drawing Figures

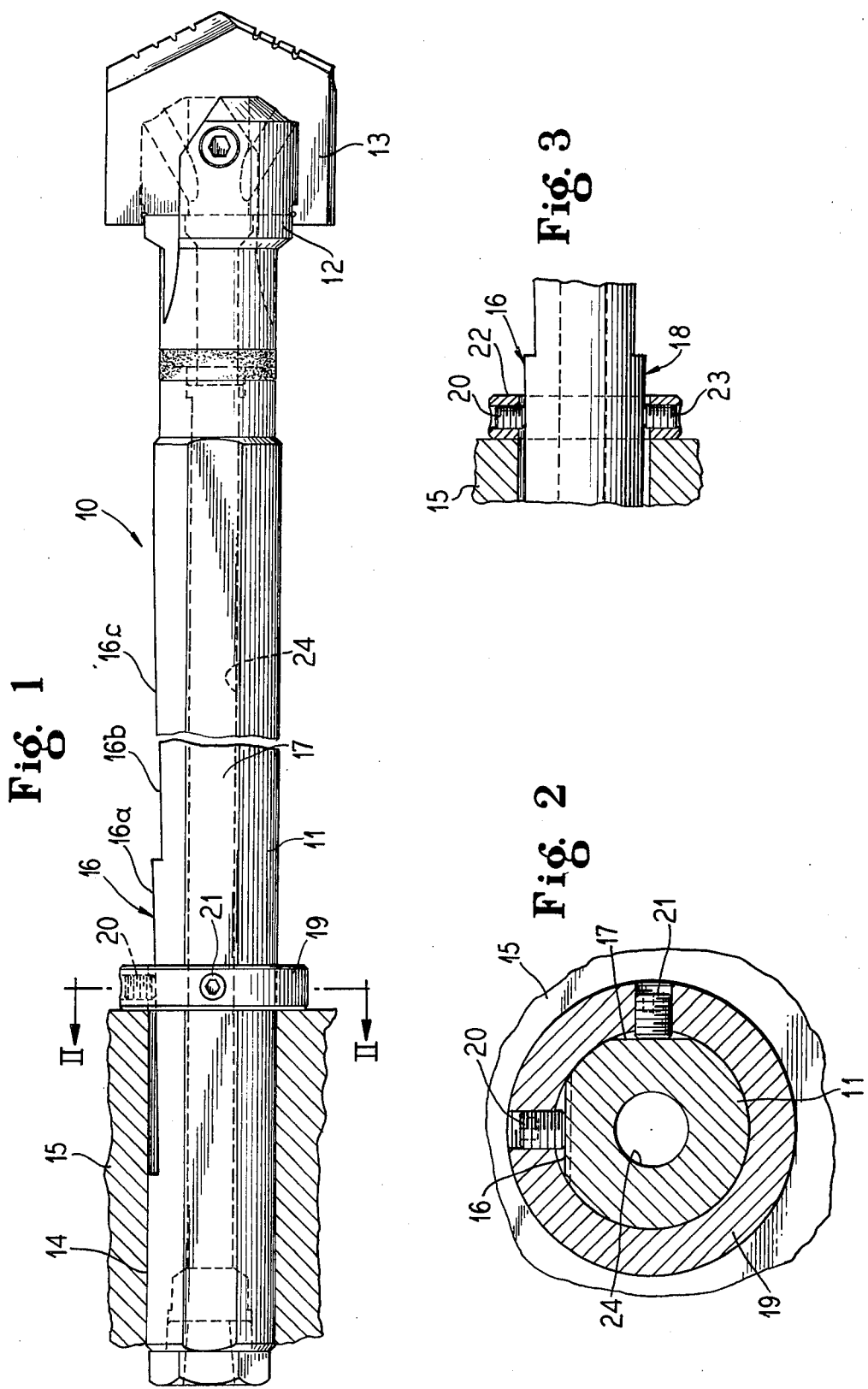

TOOL HOLDER

BACKGROUND OF THE INVENTION

1. Field of the Invention

This invention relates to a tool holder for holding a cutting tool in a machine tool.

2. Prior Art

Various types of tool holders have been previously utilized in the art. One of these types is a spade drill holder which has been known heretofore to be of two types of construction. In one type, the shank is straight which readily facilitates its being clamped into an appropriate clamping device on the machine tool. Thus this type is substantially infinitely adjustable because it can be grasped or clamped at an infinite number of locations along its straight shank. This type of construction has a disadvantage in that there is a possibility that, under heavy loads, the tool holder will be pushed back into the clamping device of the machine tool.

A second type of construction also includes a straight shank, but is accompanied by an integral shoulder that surrounds the shank, for the purpose of butting up against the clamping device. Thus the integral shoulder serves as a positive anti-push-back feature. The disadvantage of this type of construction is that there is but one fixed axial location in which the tool holder, and hence the tool, can be held or clamped.

SUMMARY OF THE INVENTION

According to the present invention, a tool holder is provided which has the advantage of axial adjustability and which has the advantage of having an anti-push-back feature. Thus to obtain both of these benefits in a single tool holder, there has been provided means wich define at least one elongated outwardly facing ramp, accompanied by an angularly displaced flat surface. The flat surface may be either parallel to the axis of the tool, or it may be a further ramp which though angularly displaced from the first-mentioned ramp, diverges with respect to it as it extends toward the cutting tool. A lock ring is adjustably clamped to the ramp and flat surface and has a side that can engage the machine tool for accurately locating the tool holder in an axial direction at an adjustably selected location which cannot yield owing to the construction described.

Accordingly, it is an object of the present invention to provide a tool holder which has both the feature of axially adjustable location and the feature of positive axial location.

Another object of the present invention is to provide a tool holder which is particularly adapted to accommodate the loads and problems associated with the use of a spade drill.

Many other advantages, features and additional objects of the present invention will become manifest to those versed in the art upon making reference to the detailed description and the accompanying sheet of drawings in which preferred structural embodiments incorporating the principles of the present invention are shown by way of illustrative example.

ON THE DRAWING

FIG. 1 is a side elevational view of a tool holder provided in accordance with the present invention, shown installed in a machine tool;

FIG. 2 is an enlarged cross-sectional view taken along line II—II of FIG. 1;

FIG. 3 is a fragmentary view corresponding to a portion of FIG. 1, showing a second embodiment of the invention.

AS SHOWN ON THE DRAWING

The principles of the present invention are particularly useful when embodied in a tool holder such as shown in FIG. 1, generally indicated by the numeral 10. The tool holder 10 has a shank 11 which is adapted at one end 12 to support a cutting tool 13, here disclosed as being a spade drill. The shank 11 is adapted at its other end 14 to be received into a portion of a machine tool fragmentarily illustrated at 15. To that end, the end portion 14 constitutes a portion that has an accurately formed and dimensioned peripheral surface which effects radial centering of the cutting tool 13. The portion 15 may constitute a rotating spindle or may constitute a portion of an indexable head of the tailstock of a turret lathe.

According to the invention, to provide axially adjustable positive location of the tool holder, there are provided means 16 defining an elongated outwardly facing ramp. The means 16 in this embodiment comprises a plurality of ramps 16a, 16b, 16c, etc. As few as one ramp 16a may be utilized for a tool having a short shank. A considerably larger number may be utilized if the shank is long. For example, the ramp 16 may be about four inches long and there would be up to 25 of these ramps for a shank that is 100 inches long. Each of the ramps in the ramp means 16 slopes radially outwardly as it extends along the length of the shank toward the cutting tool 13.

Further, the invention includes means 17 defining a flat surface which extends along the length of the shank 11 and which is angularly displaced from the ramp means 16. The flat surface 17 extends for at least the length of the ramp means 16. In the embodiment of FIG. 1, the flat surface comprises a single surface which lies in a plane parallel to the axis of the shank 11. Thus a continuous surface is shown in FIG. 1.

As an alternative, the means defining a flat surface can comprise a second set of means 18 defining one or more outwardly facing elongated ramps which are aligned end-to-end with each other and which are angularly displaced 180° from the first-mentioned ramp means 16 as shown in FIG. 3. The individual ramps of the ramp means 18 are longitudinally aligned with the individual ramps of the ramp means 16. The second ramp means 18 are thus coextensive with the first-mentioned ramp means 16.

Further, the invention includes a lock ring 19 which surrounds the shank 11 and which has a pair of set screws 20, 21 by which the same is clamped to a selected location on the ramp means 16 and the flat surface 17. In the embodiment of FIG. 3, a lock ring 22 has a pair of set screws 20, 23 for engaging the ramp means 16 and the elongated flat surface which here forms the second ramp means 18. The various set screws 20, 21, 23 have flat noses or inner ends and thus engage positively with the flat surfaces on the shank 11. The slight angle of the ramp is of no consequence in this regard and has nowhere near the effect that clamping directly on the outside diameter of the shank would have. The side of each of the nuts 19, 22 which is directed away from the cutting tool 13 is formed as a plane lying at right angles to the axis of the shank for engagement with the machine tool 15. Such engagement provides the proper spacing between the cutting tool 13 and the machine tool portion 15, such location being adjustable. Further, the slope of the ramp means 16 or 16, 18 provides a positive force against the inner end of the set screws so that if there is a substantial axial force exerted to the shank from the cutting tool, it is impossible for the shank 11 to slip inwardly further into the machine tool portion 15.

Preferably, for maximum adaptability, the shank has a bore 24 through which coolant can pass. The left end of the bore illustrated is adapted to be connected to a pressurized source of coolant. The right end of the bore 24 is bifurcated to discharge coolant onto the cutting tool 13 at the trailing side of its cutting edges.

By the arrangement shown and described, both the feature of infinite axial adjustability and the feature of limiting push-back into the machine tool in a positive manner are provided in one tool holder.

One feature or advantage of the present invention is that there is no external thread provided on any portion of the shank. The present invention is particularly advantageous for shanks having a diameter of 1¼ inches and larger, whereby a spade drill is supported for use as a roughing tool with a high feed rate.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A holder for holding a cutting tool in a machine tool, comprising:
    a. a shank adapted at one end to support the cutting tool, the other end thereof being receivable in the machine tool and adapted to locate the holder accurately in a radial direction;
    b. means intermediate said ends defining an elongated outwardly facing straight ramp extending along the length of said shank, said ramp gradually sloping radially outwardly as it extends toward said one end;
    c. means on said shank defining a flat surface extending along the length of said ramp and angularly displaced therefrom; and
    d. a lock ring surrounding said shank and clamped thereto on said ramp and on said flat surface, said ring being adapted to engage the machine tool with a side thereof facing said one end.

2. A holder according to claim 1 including a plurality of said successively engageable ones of ramps aligned with each other.

3. A holder according to claim 2 in which said ramps are aligned in end-to-end relationship.

4. A holder according to claim 1 in which said flat surface comprises a further one of said ramps.

5. A holder according to claim 2 in which said flat surface comprises a further plurality of said ramps.

6. A holder according to claim 1 in which said flat surface extends at least as long as the extent of said ramp means.

7. A holder according to claim 1 in which said lock ring has a pair of angularly displaced set screws respectively engaging said ramp means and said flat surface to effect the clamping.

8. A holder according to claim 1 having a bore extending between said ends for conducting coolant therethrough.

* * * * *